United States Patent [19]

Diec et al.

[11] Patent Number: 5,463,731
[45] Date of Patent: Oct. 31, 1995

[54] MONITOR SCREEN GRAPHIC VALUE INDICATOR SYSTEM

[75] Inventors: Stephanie Diec, Monterey Park; Lars G. Karlsson, Fountain Valley, both of Calif.

[73] Assignee: Telefonaktiebolaget L M Ericsson, Stockholm, Sweden

[21] Appl. No.: 334,796

[22] Filed: Nov. 4, 1994

Related U.S. Application Data

[63] Continuation of Ser. No. 107,337, Aug. 16, 1993, abandoned, which is a continuation of Ser. No. 545,419, Jun. 27, 1990, abandoned.

[51] Int. Cl.[6] .................................................. G06F 3/00
[52] U.S. Cl. .................................................. 395/161
[58] Field of Search .................................. 395/155–161, 395/125, 128, 139–140; 370/8; 364/525, 487; 345/117–120, 122–125, 134, 140, 179, 145

[56] References Cited

U.S. PATENT DOCUMENTS

| 2,901,664 | 8/1959 | Firmenich | 345/134 X |
|---|---|---|---|
| 3,824,597 | 7/1974 | Berg | 370/8 |
| 4,302,755 | 11/1981 | Pisani et al. | 345/134 |
| 4,400,780 | 8/1983 | Nagao et al. | 364/449 |
| 4,490,781 | 12/1984 | Kishi et al. | 395/155 X |
| 4,555,699 | 11/1985 | Citron et al. | 345/179 |
| 4,674,042 | 6/1987 | Hernandez et al. | 395/140 X |
| 4,674,043 | 6/1987 | Hernandez et al. | 395/140 X |
| 4,686,523 | 8/1987 | Bristol | 345/134 |
| 4,898,624 | 10/1987 | Barker et al. | 395/156 X |
| 4,730,262 | 3/1988 | Watanabe et al. | 395/140 |
| 4,751,504 | 6/1988 | Slavin | 364/487 X |
| 4,754,205 | 6/1988 | Diller et al. | 345/134 X |
| 4,794,455 | 12/1988 | Tamiya | 395/139 |
| 4,794,553 | 12/1988 | Watanabe et al. | 395/140 X |
| 4,812,996 | 3/1989 | Stubbs | 364/487 |
| 4,847,785 | 7/1989 | Stephens | 395/140 |
| 4,885,465 | 12/1989 | Nagatsuka et al. | 345/134 X |
| 4,896,291 | 1/1990 | Gest et al. | 395/156 |
| 4,902,469 | 2/1990 | Watson et al. | 364/525 X |
| 4,908,786 | 3/1990 | Kuno et al. | 395/140 X |
| 4,912,657 | 3/1990 | Saxton et al. | 395/155 |
| 5,039,937 | 8/1991 | Mandt et al. | 345/134 |
| 5,075,873 | 12/1991 | Seki et al. | 395/140 |
| 5,119,076 | 6/1992 | Wilson | 345/134 |
| 5,226,120 | 7/1993 | Brown et al. | 395/161 X |
| 5,255,363 | 10/1993 | Seyler | 395/159 X |

OTHER PUBLICATIONS

Heilbron, "Window 3", Computing Canada, Jul. 5, 1990, p. 34(1).
Microsoft Windows User's Guide v. 3.0, Microsoft Corp., 1990, pp. 50–55, 148–153, 304–305.
FX–7000G Owner's Manual, Casio, 1985, pp. 58–68.
"Casio FX–7000G", PTS New Product Announcement, Oct. 7, 1985, pp. 1–2.
Using Graph Plus, Micrografx, 1988, Chpts. 2–3, pp. 4–1 to 4–5, 4–33, 6–9, 8–6.
Fuller, Using Autocad, 1989, pp. 8–14 to 814 17, 13–10 to 13–20.
McMullen et al, "Microsoft Introduces Windows 3.0", Newsbytes May 24, 1990.
*Easy CAD* v. 1.08, Evolution Computing, 1987, pp. 29–41, 63–74, 165–172, 177–251.
Robinson, Phillip, "Desktop Engineering", MacUser, Jul. 1988, pp. 136–148.

*Primary Examiner*—Mark R. Powell
*Assistant Examiner*—John E. Breene
*Attorney, Agent, or Firm*—Jenkens & Gilchrist

[57] ABSTRACT

An visual interface for a graphic display including a plurality of scales with respective points having values showing a graph, waveform, or chart. A user may interactively move throughout the graph, waveform, or graph with an indicator line that is connected from a point on each graph, chart, or waveform to a respective scale. A digital numeric value associated with each point and having greater resolution than the scale is displayed in a respective window. Windows are simultaneously displayed and the numeric values are updated dynamically with interactive movement from the user. Data shown in the graph, waveform, or chart may involve traffic displays of a telephone switch.

4 Claims, 6 Drawing Sheets

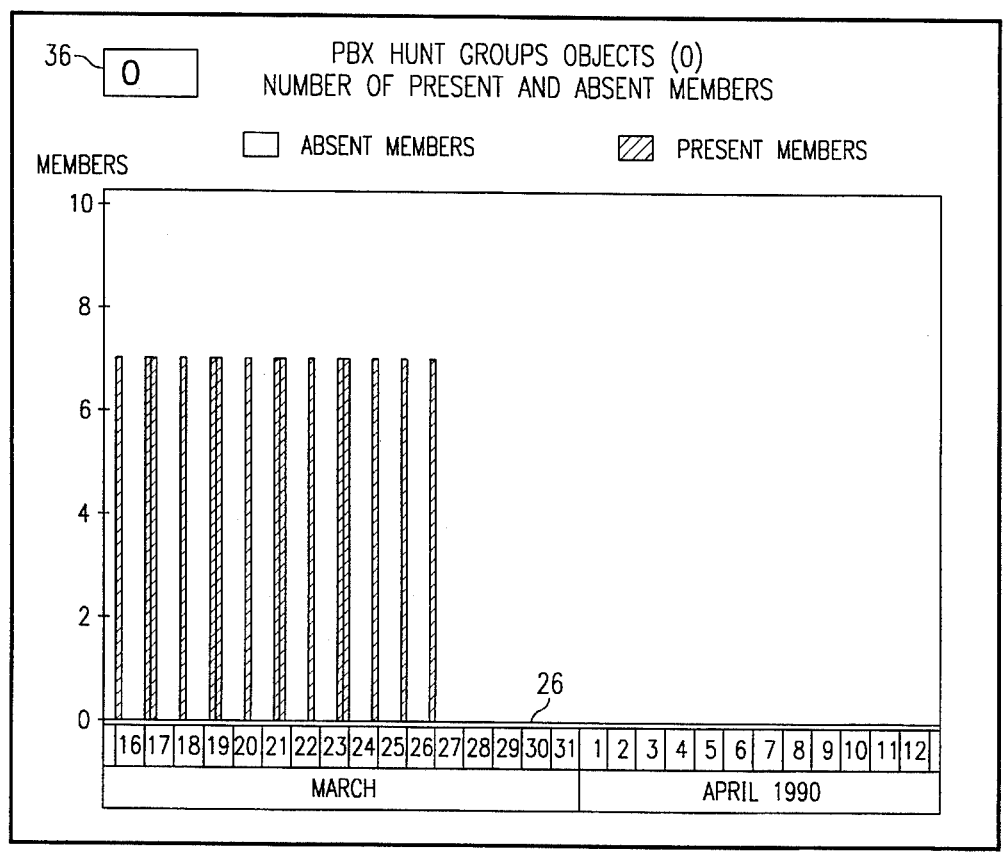

```
TRDIP:
   TRAFFIC RECORDING DIRECTORY

MENO    OBJECT   START1    STOP1     START2  STOP2   TIME LIM            INFO

0       EXTENS   08MAR90   30MAR90                   08:30-24:00  ALL
1       PCMLIN   08MAR90   30MAR90                   08:30-24:00  ALL
2       KEYC-S   08MAR90   30MAR90                   08:30-24:00  ALL
3       KEYC-R   08MAR90   30MAR90                   08:30-24:00  ALL
4       DIALDY   08MAR90   30MAR90                   08:30-24:00  ALL
5       PBXGRP   08MAR90   30MAR90                   08:30-24:00     GRP=12320
6       C-BELL   08MAR90   30MAR90                   08:30-24:00     GRP=12351
7       ROUDIO   08MAR90   30MAR90                   08:30-24:00     ROU=53
8       TRUNKS   08MAR90   30MAR90                   08:30-24:00     ROU=53
                                                                     TRU=002-01
9       TONE-R   08MAR90   30MAR90                   08:30-24:00  ALL

END
<TRREP: MENO-0, PERIOD=2, DATE=1990-03-90;
   TRAFFIC RECORDING RESULT DATA

DATE           MENO          OBJECT
09MAR90         0            EXTENS

TIME                 TRAFFIC        CALLS       NDV      NBLO

08:30-08:45          141.26         3677        402      0
08:45-09:00          145.75         3722        402      0
09:00-09:15          145.92         3751        402      0
09:15-09:30          140.82         3697        402      0

BUSY HOUR START TIME = 08:30

END
<TRREP: MENO=1, PERIOD=2, DATE=1990-03-09
   TRAFFIC RECORDING RESULT DATA

DATE           MENO          OBJECT
09MAR90         1            PCMLIN

TIME                 TRAFFIC        CALLS       NDV      NBLO    CONG

08:30-08:45          87.26          2389        300      0       0
08:45-09:00          84.52          2316        300      0       0
09:00-09:15          86.26          2397        300      0       0
09:15-09:30          83.15          2302        300      0       0

BUSY HOUR START TIME = 08:30

END
<TRREP: MENO=2, PERIOD=2, DATE=1990-3-09;
   TRAFFIC RECORDING RESULT DATA

DATE           MENO          OBJECT
09MAR90         2            KEYC-S

TIME                 TRAFFIC        CALLS       NDV      NBLO    CONGO   CONGP    OFLO
```

FIG. 8

```
/*
 *
 *  _____
 *
 *      Procedure Name  :   int grid_line (erase)
 *
 *      Description     :   draw a high-lighten grid line.
 *
 *      Argument        :
 *          int erase - flag to display the previous image back to screen.
 *
 *      Return          :
 *          FALSE if there is error in reading the image screen.
 *
 *      Subordinate     :   graph_plot()
 *
 *  _____
 *
 */
int     grid_line(erase)
int     erase;
{
  int       pixel;    /*no. of pixel to draw a high lighten line * /
  int       id,k,j,m,i;
  rect      window[2];
  unsigned int  number;
  char      *c,exp[10],nyl[20];
  long      imBytes;  /* no. of image bytes  * /
  float     value;    /* value to display corresponding to the high line  * / if (erase == NEW) {   /* first screen  * /
      step = 0;               /* initialize the step and line  * /
      line = 0;
  }
  else if (erase == CHANGE) { /* display back the previous image  * /
      RasterOp(0);
      WriteImage(&stepline,Gridimage);
      free(Gridimage);
      return(TRUE);
  }
  else if (erase == NO_CHANGE) { /* display back the previous image  * /
      RasterOp(0);                    /* Reset the Pen to normal mode  * /
      WriteImage(&stepline,Gridimage);  /* Write the image back to screen  * /
      free(Gridimage);                  /* free the image  * /
  }

/*  each grid consists of 62 pixels  * / if(step == 62){  /* it hits to the top of the next grid  * /
      line++;             /* move to next grid line  * /
      step = 0;           /* reset the step          * /
  }
  else if(step == -1)  {   /* starts over again */
          step = 61;              /* decrement the step  * /
          line--;                 /* and the line        * /
  } if(line > 5 ) line < 0) {  /* hits to the up or down of the grid line  * /
      line = 0;  /* reset to the lower line  * /
      step = 0;
  } if(step == 1 && line == 5){  /* reset to the bottom line  * /
      line = 0;               /* if it hits to the upper line  * /
      step = 0;
  }
  RasterOp(0);
  PenNormal();           /* initalized the pen mode  * / pixel = gridstep[0][line]+step;

SetRect(&stepline,62,pixel,578,pixel+1); /* Set up the message rectangle  * /

/*  Allocate the space for image copy  * /
```

FIG. 9a

```
    imBytes = ImageSize(&stepline);
    if(imBytes > 32000) { /* Screen image too big to store */
        error(12,"");     /* display image too large error message */
        return(FALSE);
    }
    Gridimage = (image *)malloc((unsigned int) imBytes);
    if(Gridimage == NULL) {
        error(13,"");     /* display insufficient memory error message */
        return(FALSE);
    }
    ReadImage(&stepline,Gridimage);    /* Read and store the current screen
                                                                  image */
    /* Display the window and message */
    RasterOp(1);     /* Set the pen with overlay mode */
    PenColor(15);    /* Set the pen color to white */
    MoveTo(62,pixel);   /* Draw a grid line */
    LineTo(578,pixel);

TextPath(pathRight);
    TextAlign(alignLeft,alignMiddle);

pixel -= 55;
    id = (line > 0) ? line : 1;

for(i=0; i<parplot.no_label;i++){
        PenColor(nc[2]);   /* draw small window(s) in yellow color */
        SetRect(&window[i],4+572*i,445,60+570*i,465);  /* Set up the
                                    window to display the value */
        EraseRect(&window[i]);
        FrameRect(&window[i]);
        PenColor(nc[6]);  /* display the value in white color */ if(step == 0)    /* get the value from label value */
            value = value_4_y[i][line];
        else             /* calculate for the corresponding value */
            value = (float)((nstep[i]*pixel) /62.) + value_4_y[i][0];

/* convert the value to string */
    if(value <= 32767.) {    /* within the integer range */
        number = (unsigned int)(value +0.5);
        c = itoa(number,nyl,10);
    }
    else {    /* 'e' will label if the number is larger than 1000. */
        gcvt(value,2,c);        /* convert the no. to string */
        for(k=0; k<strlen(c)+1;) {    /* search the 'e' in string */
            if(c[k] == 'e' )break;
            k++;
        } if(k == 4) {  /* Only 2 decimals will be display */
            k--;
            strcpy(&c[3],&c[4];
        }
        for(j=k+1,m=0; j<strlen(c)+1;j++)  { /* store the exponential part */
            if(c[j] != '0'){
                exp[m] = c[j];
                m++;
            }
        }
        exp[m] = '0';
        c[k+1] = '0';
        strcpy(nyl,&c[0];
        MoveTo(35+574*i,458);
        DrawString(exp);   /* label the exponential part */
    }

MoveTo(8+572*i,450);   /* Label the y axis scale */
    DrawString(nyl);       /* Label the integer part */
    }
    return(TRUE);
}
```

FIG. 9b

MONITOR SCREEN GRAPHIC VALUE INDICATOR SYSTEM

This is a continuation of application Ser. No. 08/107,337, filed Aug. 16, 1993, now abandoned, which is a continuation of application Ser. No. 07/545,419, filed Jun. 27, 1990, now abandoned.

CROSS REFERENCE TO RELATED APPLICATIONS

This application is related to the following U.S. patent applications:

| TITLE | INVENTOR(S) | SERIAL NO. |
| --- | --- | --- |
| Communications Protocol for Switching Systems | Clary et al. | 07/544,839 |
| Communications System Using a Fault Tolerant Protocol | Lee et al. | 07/544,675; now U.S. Pat. No. 5,163,055 |
| Language Independent Self-Centering Menu Handling of Traffic Recording Presentation | Lee | 07/544,679 |
| Method and Apparatus for Error Tracking in a Multitasking Environment | Kasman | 07/544,413 |

All cross referenced applications have been filed on even date herewith and assigned to the assignee of the present invention. All of these related applications are hereby incorporated herein by reference.

BACKGROUND OF THE INVENTION

1. Field of the Invention

The present invention relates to screen displayed graphics and, more particularly, to measurement and value display arrangements therefor.

2. Description of Related Art

The prior art is replete with various systems in which information is at some point displayed graphically on a computer screen. Often the displayed information relates to events occurring over time. In such cases it has been found convenient to display the information in the form of a bar graph or waveform placed on a x–y coordinate system with the x-axis indicating time and the y-axis indicating number of events. Based upon the abscissa (horizontal coordinate obtained by measuring parallel to the x-axis) and ordinate (vertical coordinate obtained by measuring parallel to the y-axis) values of any displayed point on a bar graph or waveform, and based upon the scale of the x- and y- axes, meaningful information relating to number of events at a particular time is communicated by such displays.

Heretofore, programs presenting graphical information have generally been designed so that the user has to estimate abscissa and ordinate values of a point by "eyeballing" from the point to the x- and y- axis scales. Some programs have attempted to improve the accuracy of such readings by displaying a fixed rule (i.e., graph paper-like background) on the screen.

Both of these approaches are clumsy and time consuming to use and both produce inaccurate results. Although the "fixed rule" approach can help a user extract estimated values off of a distant scale, not infrequently it is troublesome to use in that the proper rule (of a number of rules) is "lost" as one attempts to "follow" it from a point to a scale.

In addition to the above-described general approaches, some programs heretofore have included more advanced arrangements for facilitating the determination of the value of a point, or the relationship between points, as indicated on, or could be determined with reference to, a distant scale.

In U.S. Pat. No. 4,751,504 to Slavin, for example, two cursors are used to determine the difference in positions of points on a waveform. According to the teachings of Slavin, a cursor interface for a waveform display provides for movement of a waveform relative to a first cursor. When the first cursor overlies a desired point on the waveform, the cursor can be "locked" to the waveform. Then, the first cursor and the waveform can be moved together relative to a second cursor. When the second cursor overlies another desired value on the waveform a measurement value can be displayed indicating the difference in positions on the waveform of the cursors.

Another approach may be seen in U.S. Pat. No. 4,730,262 to Watanabe et al. which teaches a scanning display including a plurality of bar graphs. The plurality of bar graphs have associated scanning and margin times, which are digitally displayed in conjunction with the graphical display of the bar graphs.

Notwithstanding the voluminous teachings of the prior art, nowhere is there disclosed or suggested a graphic value indicating system that uses a rule to facilitate determining information about a point in a coordinate system with reference to a distant scale, and which also uses a digital display to locate the rule. The absence of such a value indicating system is a shortcoming and deficiency of the prior art.

SUMMARY OF THE INVENTION

The present invention overcomes the shortcoming and deficiency of the prior art by providing a graphic value indicating system that uses a moveable rule and various other means to facilitate determining information about points on a display screen. More specifically, the present invention provides an interface for a graphic screen display including a scale and a plurality of points having values with reference to the scale. This interface includes at least one operator moveable indicator line that assumes various values throughout its range of movement. Embodiments of the present invention also include at least one direct value subdisplay presenting the value assumed by the at least one line at any particular instant. A preferred embodiment of the present invention involves displays of data relating to traffic in a switch.

Accordingly, it is an object of the present invention to provide a means for facilitating extraction of data from a graphic screen display.

Another object of the present invention is to provide a means for quickly and accurately determining the abscissa and/or ordinate values of a point on a Cartesian coordinate system display, which means is particularly useful when the points fall at the top of a bar graph or on a waveform on the display.

Still yet another object of the present invention is to provide a value display system that provides at least two presentations of an indicated value, one presentation involving location of a line against a scale and the other involving a direct value display.

BRIEF DESCRIPTION OF THE DRAWINGS

For a more complete understanding of the present invention, and for further objects and advantages thereof, reference may now be had to the following description taken in conjunction with the accompanying drawings in which:

FIG. 5 is still yet another sample screen display according to the teachings of the present invention;

FIG. 6 is a flow chart of indicator line movement logic according to the teachings of the present invention;

FIG. 7 is a flow chart of scale change logic according to the teachings of the present invention;

FIG. 8 is a sample printout that can be produced by a switch such as that shown in FIG. 1; and FIG. 9 (consisting of FIGS. 9a and 9b) presents pertinent parts of a computer program that can effect an embodiment of the present invention in a presentation PC.

DETAILED DESCRIPTION OF THE INVENTION

Although the present invention is hereinafter described with reference to a particular environment and application, those skilled in the art will recognize and appreciate that the display interface of the present invention has wide applicability to situations other than that specifically described. In fact, the display system of the present invention may be incorporated into any number of graphic computer screen displays and is especially useful in circumstances in which bar graphs, curves, waveforms or other such visual representations of data are employed.

Figure 1:
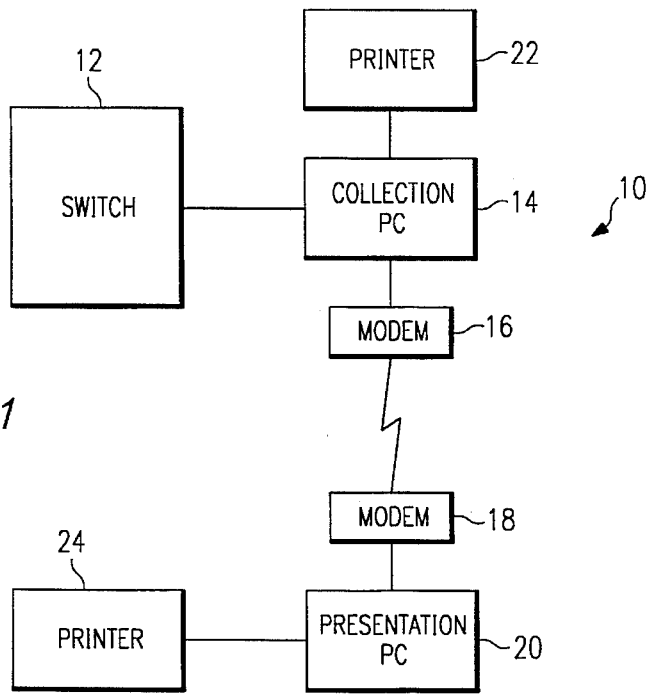
FIG. 1 is a block diagram of a switch traffic measurement recording system in which the present invention has been usefully incorporated.

With the above understanding, referring now to FIG. 1, there is shown a Traffic Recording Presentation system generally designated by reference numeral 10. The term "traffic" with reference to system 10 refers to traffic in a switch 12, such as the model MD-110 network switch manufactured by the assignee of the present invention. Connected to the switch 10 is a collection personal computer (PC) 14. A presentation PC 20 is connected to the collection PC via modems 16 and 18. Associated with both PC's 14, 20 are printers 22, 24. Further details regarding the operation of the collection PC 14 and presentation PC are set forth below.

Before considering the collection PC 14 and presentation PC 20 further, however, it is helpful to have a more complete understanding of the traffic in switch 12. There is a multitude of pieces of information about traffic through a switch that can be usefully collected and analyzed. For example, total number of calls handled over a particular time period can be monitored to ensure that switch capacity is economically used but not overused. Information regarding traffic intensity over trunks associated with the switch 12 can be used by systems engineers to ensure that the relevant portion of the communication system is appropriately designed. There are a multitude of other such pieces of information that can be usefully collected and analyzed. Although those skilled in the art should be well aware of the types of information that may be collected regarding a switch, for convenience in understanding both the types of information and extent thereof that may be collected, there is set forth below is partial list of usefully collected information about switch operation:

With regard to Operators:
number of calls
number of abandoned calls
number of on-line operators
average response time
average handling time
With regard to Voice and Data Stations:
number of stations
number of call attempts
number of blocked stations
traffic intensity
With regard to Trunk Lines:
number of trunk lines
number of blocked trunk lines
number of call attempts
traffic intensity
With regard to Incoming and Outgoing Routes:
number of trunk lines
number of blocked trunk lines
number of incoming call attempts
traffic intensity
With regard to Dial Tone Delay:
number of call attempts requiring dial tone
number of abandoned calls without dial tone
number of calls w/dial tone delay greater than 1 second
number of calls w/dial tone delay greater than 3 second
number of calls w/dial tone delay greater than 10 second
With regard to MFC Sender and Receivers:
number of tone sender ports
number of blocked MFC sender ports
number of seizure attempts
number of seizure attempts that overflow
number of seizure attempts that overflow and fail
number of overflow attempts that fail due to PCM congestion
traffic intensity
With regard to Key Code Senders and Receivers:
number of key code sender ports
number of blocked key code sender ports
number of seizure attempts
number of seizure attempts that overflow
number of seizure attempts that overflow and fail
number of overflow attempts that fail due to PCM congestion
traffic intensity
With regard to Tone Receiver
number of tone receiver ports
number of blocked tone receiver ports
number of seizure attempts
number of seizure attempts that overflow
number of seizure attempts that overflow and fail
number of overflow attempts that fail due to PCM congestion
traffic intensity With regard to PBX Groups
number of present members
number of absent marked members
number of call attempts
number of queued call attempts
number of rejected calls due to queue congestion
average queueing time
average queueing length
number of calls in the queue that are abandoned
traffic intensity
With regard to Common Bell Group
number of call attempts
number of rejected calls due to queue congestion
average queueing time
traffic intensity
With regard to MODEM Groups
number of MODEMS in the group
number of blocked MODEMS
number of attempts to seize a MODEM
number of failed attempts to seize a MODEM
traffic intensity
With regard to Paging
number of total calls
number of congested calls
average search time
number of searched calls
average queue time
number of queued calls
traffic intensity It should be appreciated that the list set forth above is only a partial test of information that system engineers or operators or others may wish to collect about switch traffic. It should also be appreciated that much of the above-listed data is most usefully collected over time, e.g., from hour to hour during a day, from day to day over a week, and so on.

Recognizing now that there is a multitude of pieces of information that may be useful collected regarding switches, it may now be noted that systems presently exist for displaying that information. Such presently used systems generally involve printouts that are produced by a subcomponent of the switch 12. These printouts are formulated based upon operator input paraments and generally look something like that which is presented in FIG. 8.

Needless to say, the presentation of information in printouts such as that reproduced above is confusing on its face. The reported information is difficult to read and, thus, only readily useful to someone extremely skilled in reading such printouts.

Referring now to FIGS. 2, 3, 4 and 5, shown therein are actual screen displays of a presentation PC in a system including use of the present invention. The information presented in the screen displays of those FIGS. is generally the same type of information presented in the printout above; however, being presented in bar graph form, it is much clearer what values are presented and their significance.

Although the precise content of the information displayed in the screen displays of FIGS. 2, 3, 4 and 5 is not especially significant, certain aspects of those screen displays are significant. First, as should be readily appreciated by those skilled in the art, the screen displays generally employ a Cartesian coordinate system, with one axis (the x-axis, typically) representing some period of time and the other axis representing a number [of, for example, calls, erlangs (a unit of traffic intensity, measured in number of arrivals per mean service time), seconds, or members]. Imposed upon the Cartesian coordinate system are bar graphs, effectively representing some value on one axis (e.g., number) to a value on a second axis (e.g., time).

With the above understandings, the roles of the collection PC and presentation PC may now be understood. In effect, data regarding traffic in switch 12 (formerly printed out by the switch) is in system 10 (shown in FIG. 1) extracted or otherwise retrieved from the switch by a computer (the collection PC) and subsequentially forwarded to another computer (the presentation PC) for graphical display. Further, data may be printed out in various predetermined forms from either PC 14 or PC 20 via printers 22 or 24, respectively. Those skilled in the art should appreciate that while two computers are shown in FIG. 1, the functions of both of the computers may be performed by a single computer. Other variations and configurations are possible, but not being directly relevant to the present invention, they are not discussed further herein. What is very significant with respect to the present invention is a graphic interface or computer display screen portion (i.e., on the screen of computer 20 in the system of FIG. 1), which may arise in any number of systems, as mentioned above in the description of related art section.

Figure 2:
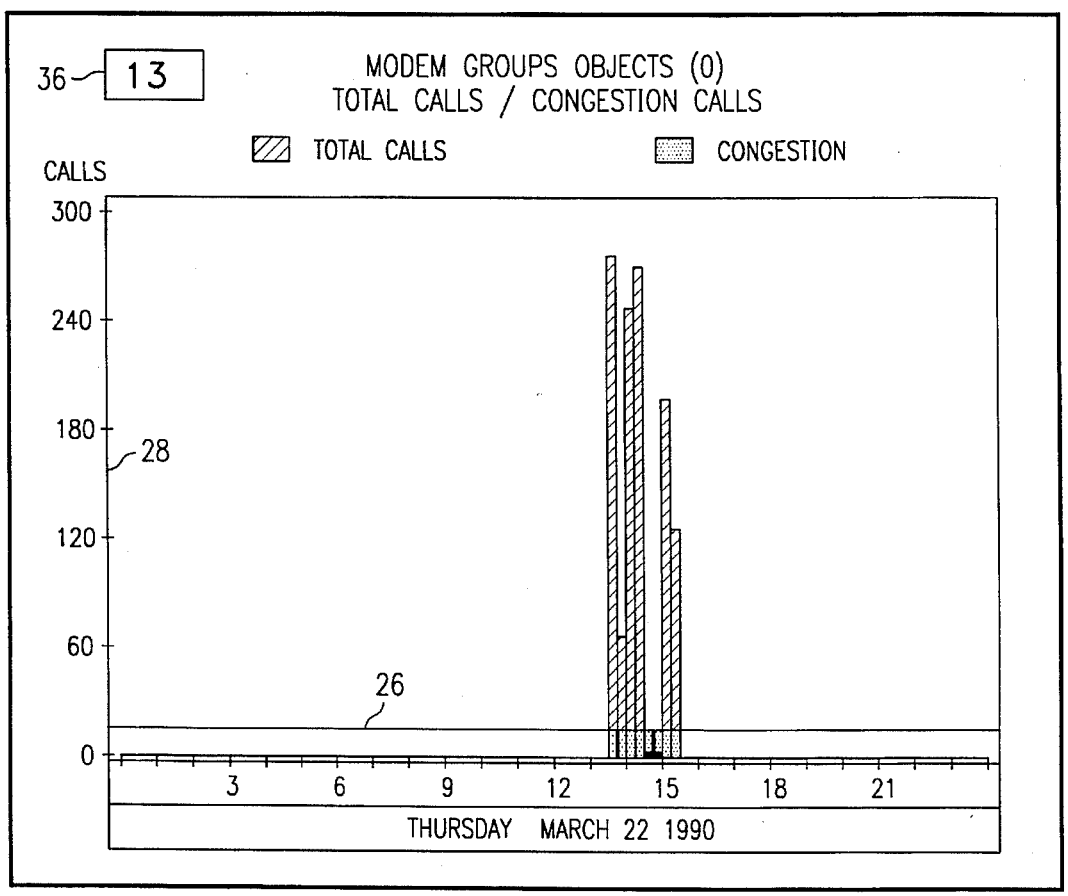
FIG. 2 is a sample screen display according to the teachings of the present invention.

One extremely important aspect of the present invention is rule or line 26 shown on the display of all FIGS. Please note that for clarity and convenience, identical or similar elements, e.g., line 26, are designated by the same reference numeral throughout the several views. Line 26 is operator moveable, e.g., by moving an up or down arrow key. Referring to FIG. 2, it may be seen that the line 26, as it moves up or down, moves along one of the axes, specifically, axis 28. Further with reference to FIG. 2 it may be noted that on Mar. 22, 1990, from 12 noon to 12 midnight (i.e., a time), total call/congestion level was 13 (i.e., a number). It will be noted that this value (13) was extremely easily and accurately extracted off the display shown in FIG. 2; this aspect and reasons for this aspect are discussed further below.

Figure 3:
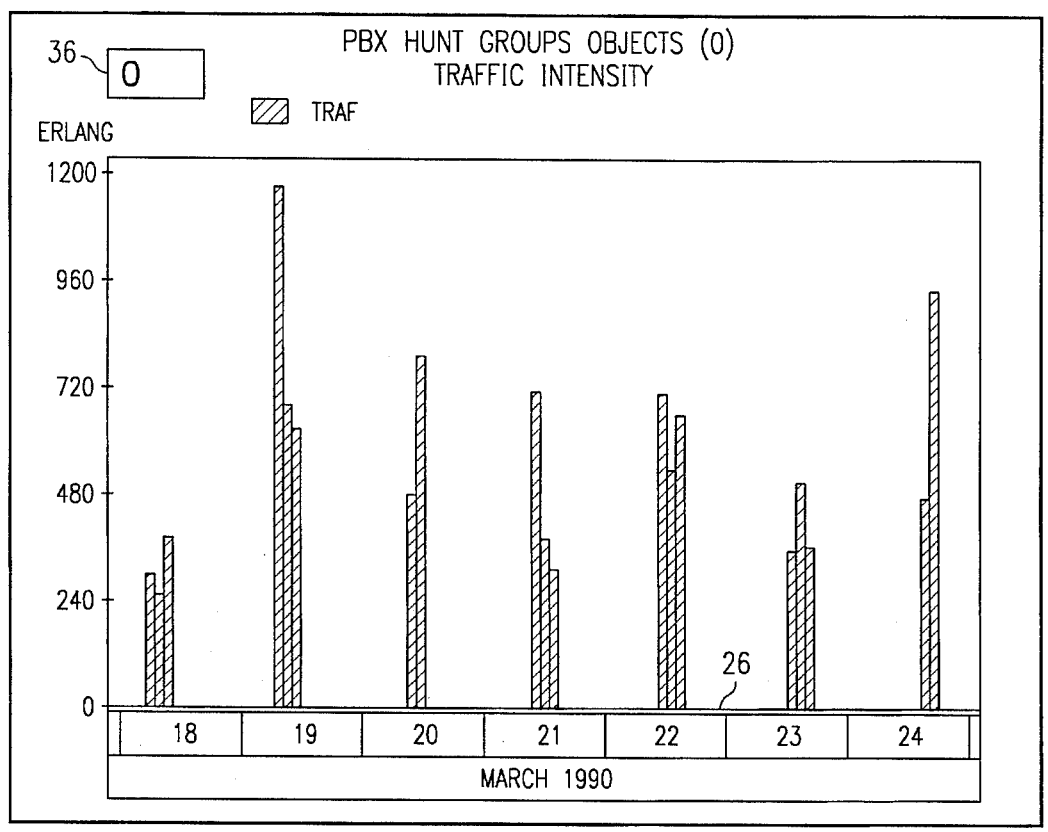
FIG. 3 is another sample screen display according to the teachings of the present invention.
Figure 4:
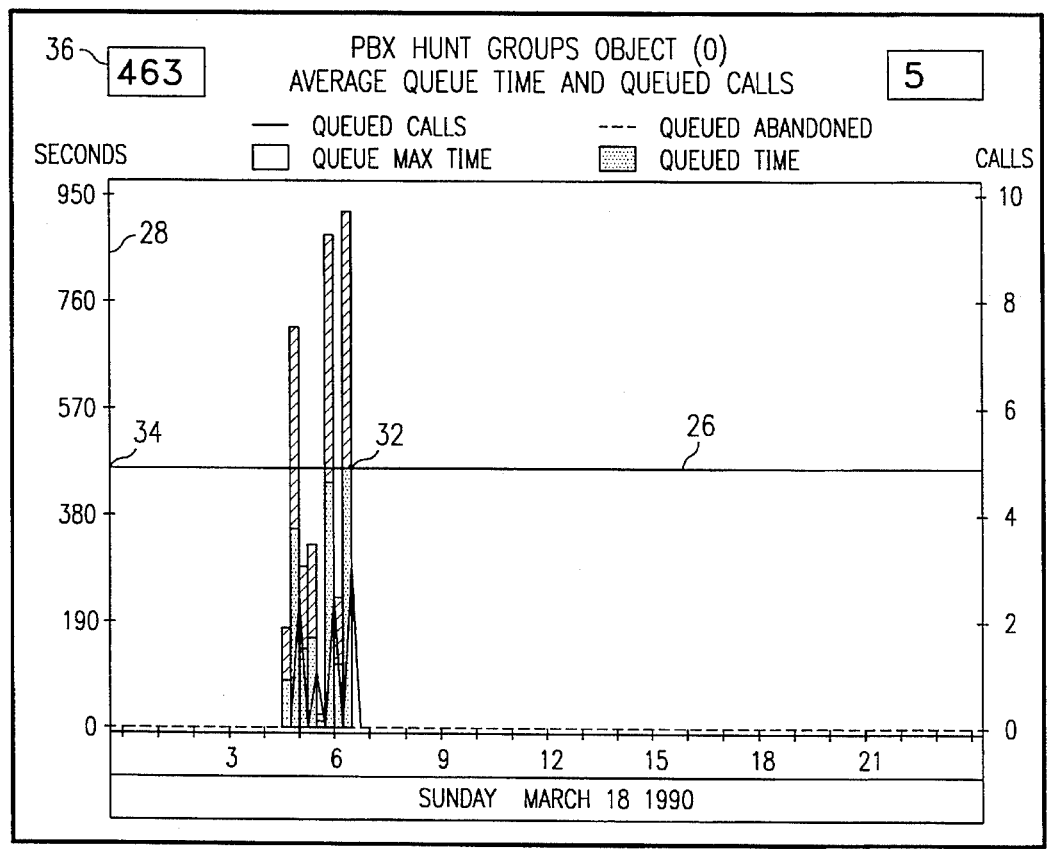
FIG. 4 is yet another sample screen display according to the teachings of the present invention.

Comparing the display shown in FIG. 2 to the ones shown in FIGS. 3 and 4 and further to the one shown in FIG. 5, it may be noted that different time scales are shown. More specifically, the display shown in FIG. 2 shows time for a day, the displays shown in FIGS. 3 and 4 show time over a week period, and the display shown in FIG. 5 shows a twenty-eight day period, extending over into two different calendar months. This difference of time scale is for convenience in tracking trends over various time periods over which plotted values may vary significantly. This difference of time scale plays some roles in embodiments of the present invention discussed further below.

Referring back to line 26, as line 26 can move along an axis (e.g., one or more y axes as shown in the various FIGS.), it should be appreciated that a screen display viewer/operator can move the line 26 to a predetermined height on the screen, that height corresponding to some point of a series of points having values the viewer/operator would like to determine. With the line 26 positioned to overlay a point (e.g., point 32 in FIG. 4) the point where the line 26 contacts the scale gives the value associated with the point. With continued reference to FIG. 4, this latter point is point 34.

Combined with the above it may be noted that certain screen displays according to the teachings of the present invention, including all of those shown in FIGS. 2–5, include a direct, window type, value display. In that window, e.g., window 36 in FIG. 5, the value on which line 26 rests is displayed, i.e., zero in that case. Needless to say this aspect of various embodiments of the present invention greatly facilitates determining values. For example, in FIG. 2 it can be generally recognized by the point of contact of line 26 with scale 28 that the indicated value is about 15, but the display 36 more accurately shows it to be 13. Likewise, in FIG. 4, the value 463 is most quickly and accurately determined by referring to the window display 36.

Yet another aspect of the present invention may be noted with respect to FIG. 4. In the display shown in that FIG., it may be noted that there are two scales, a left scale for number of seconds and a right scale for number of calls, and two windows, each window associated with a different one of the two scales. From this example, it should be understood that embodiments of the present invention may include a number of windows and/or indicator lines with the important point being the inclusion of appropriate means for facilitating operator "reading" of graphically presented data.

As has been previously indicated, an embodiment of the present invention has actually been constructed for a traffic measurement recording application as generally discussed with reference to FIG. 1. For the convenience of those skilled in the art in understanding how to effect the present invention, and by way of example only, set forth in FIG. 9 are pertinent parts of a computer program that can effect an embodiment of the present invention in a presentation PC.

To facilitate understanding the program portions depicted in FIG. 9 for those not skilled in the programming art, set forth as FIGS. 6 and 7 are flow charts of the logic used in an embodiment of the present invention. The logic depicted in the chart of FIG. 6 specifically relates to line movement while the logic depicted in the chart of FIG. 7 relates to scale change.

Based on the foregoing, those skilled in the art should appreciate that the display or interface of the present invention greatly facilitates review and analysis of data presented in a bar graph, wave form, or similar form. Embodiments of the present invention can include multiple means, interacting to display selected values associated with a particular point or points on a screen. One embodiment of the present invention, a traffic measurement recording system, has been discussed in great detail herein, including detailed instructions for practice of that system, in an effort, in part, to show the wide utility of the present invention and to illustrate the improvements it constitutes over the prior art.

Obviously, numerous modifications and variations are possible in view of the above teachings. Accordingly, within the scope of the appended claims, the present invention may be practiced otherwise than as specifically described herein.

What is claimed is:

1. A visual display interface, said visual display interface presenting for simultaneous user viewing a plurality of graphical pictures, each presented graphical picture exhibiting a relationship between two sets of numbers as a chart, graph or waveform defined by a plurality of points, said visual display interface comprising:

a plurality of presented scales, each scale presented for user viewing in association with one of the presented graphical pictures, each of said plurality of points having a numerical value with respect to at least one of the presented scales;

an indicator line presented for user viewing and manipulation, said indicator line movable along each of the presented scales to visually indicate on the scales the numerical value of a selected point in each of the graphical pictures by interconnecting the selected point on the picture and at least one of said scales; and a plurality of windows corresponding in number to the plurality of scales, each window presented for user viewing at a location on the visual display interface different from a location for the scales, each of said windows displaying, in addition to any visual indication provided by the scales themselves, the numerical value of the selected point on a corresponding one of the graphical pictures with a greater resolution than that visually indicated by the value indicator line on the scales.

2. The visual display interface as in claim 1 wherein the chart, graph or waveform of each of the graphical pictures is displayed in relation to a Cartesian Coordinate system having an x-axis defined by one set of the two sets of numbers and a y-axis defined by another set of the two sets of numbers, with each one of said presented scales oriented parallel to either the x- or y-axis of said system.

3. The visual display interface as in claim 1 further including means responsive to user input for moving the value indicator line along the scales to identify, both on the scales and in the windows, and further updated and identified as the value indicator line moves in response to user input, the numerical value of any of the points of the graphical pictures.

4. The visual display interface as in claim 1 further including:

means for connecting the visual display interface to a telephone switch; and means for monitoring communications traffic in the telephone switch, wherein the chart, graph or waveform presents data relating to the monitored communications traffic being handled by the telephone switch.

\* \* \* \* \*

UNITED STATES PATENT AND TRADEMARK OFFICE
CERTIFICATE OF CORRECTION

PATENT NO. : 5,463,731  
DATED : Oct. 31, 1995  
INVENTOR(S) : Diec et al.

Page 1 of 2

It is certified that error appears in the above-indentified patent and that said Letters Patent is hereby corrected as shown below:

Column 8, line 3  After "of"  
Insert --overlaid--

Column 8, line 5  Before "relationship"  
Insert --numerical--

Column 8, line 6  Replace "points,"  
With --points determined from the numerical relationship, at least one picture exhibiting a different numerical relationship from the other pictures,--

Column 8, line 8  After "of"  
Insert --simultaneously-- and  After "presented"  
Insert --, nonintersecting--

UNITED STATES PATENT AND TRADEMARK OFFICE
CERTIFICATE OF CORRECTION

PATENT NO. : 5,463,731
DATED : Oct. 31, 1995
INVENTOR(S) : Diec et al.

It is certified that error appears in the above-indentified patent and that said Letters Patent is hereby corrected as shown below:

Column 8, line 28   Replace "scales."
　　　　　　　　　　　　With --scale corresponding to said window.--

Signed and Sealed this

Twenty-first Day of October 1997

Attest:

*Attesting Officer*

BRUCE LEHMAN

*Commissioner of Patents and Trademarks*